Jan. 29, 1963   H. E. HRUSKA ET AL   3,075,501
POWER STEERING MECHANISM
Filed June 15, 1959   4 Sheets-Sheet 1

INVENTORS
HOWARD E. HRUSKA.
FARLOW B. BURT.
ARTHUR K. BROWN JR.
BY William N. Antonio
ATTORNEY.

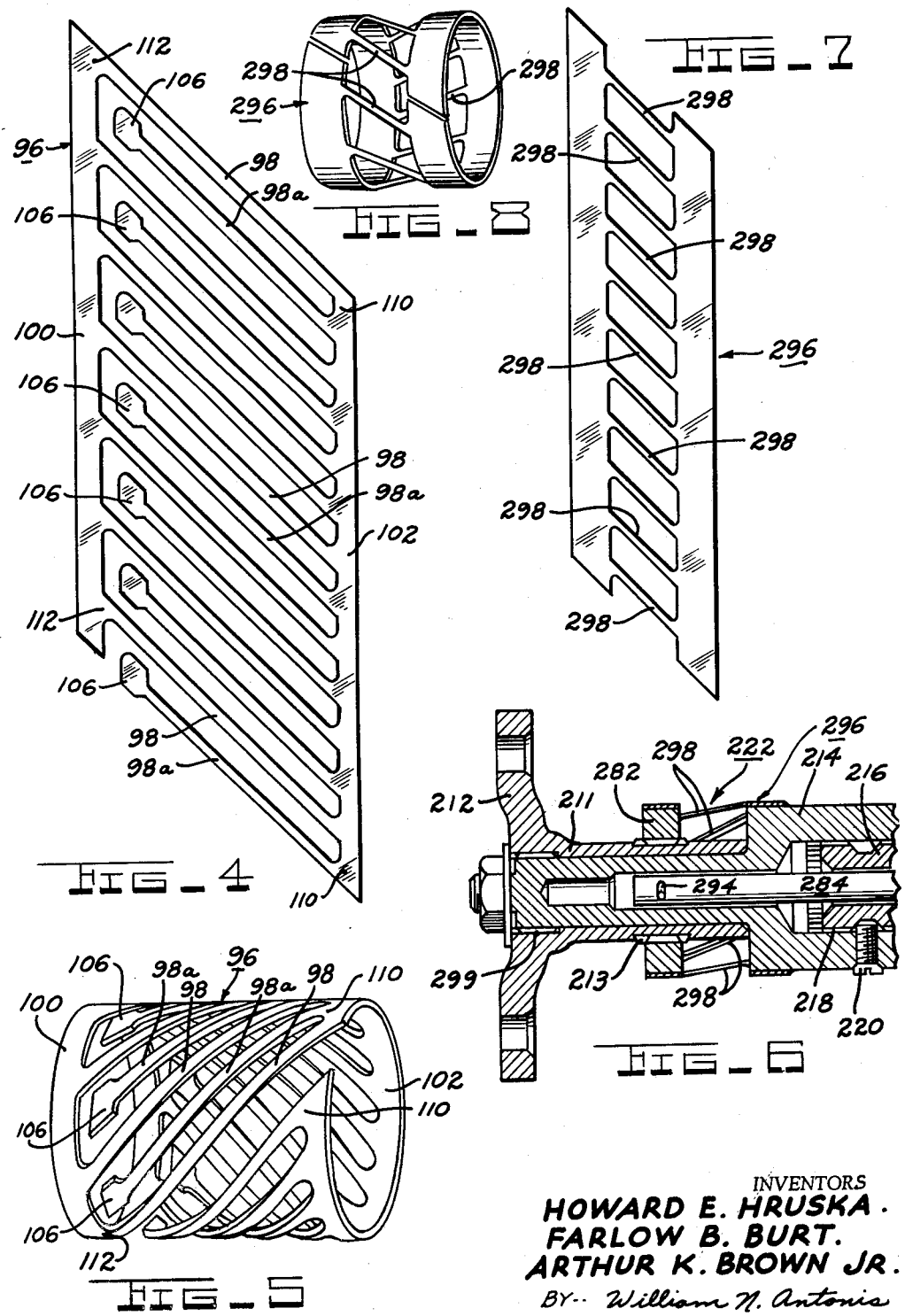

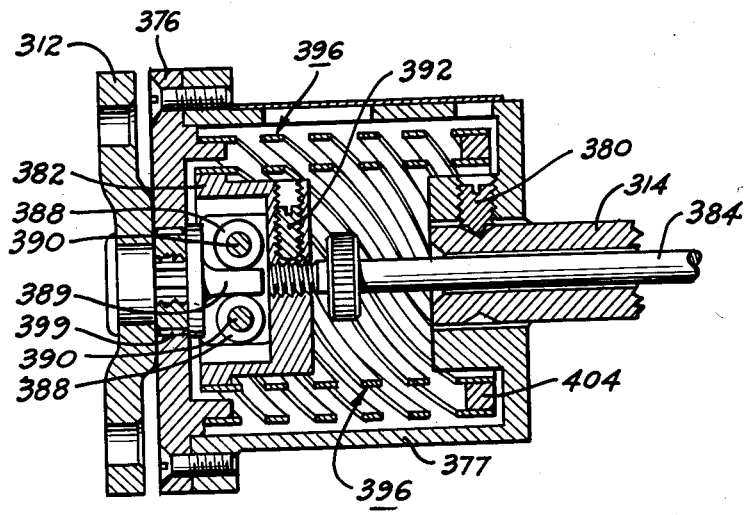
FIG_9
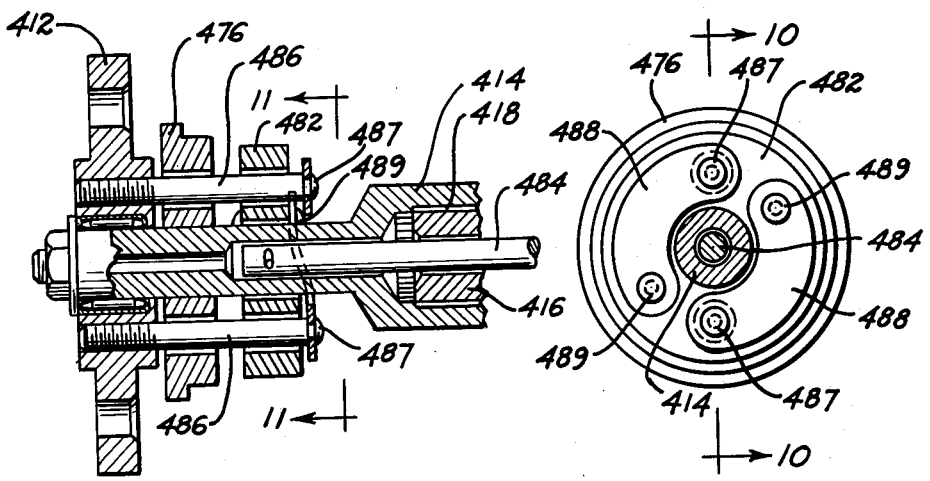
FIG_10   FIG_11
INVENTORS
HOWARD E. HRUSKA.
FARLOW B. BURT.
ARTHUR K. BROWN JR.
BY William N. Antonio
ATTORNEY.

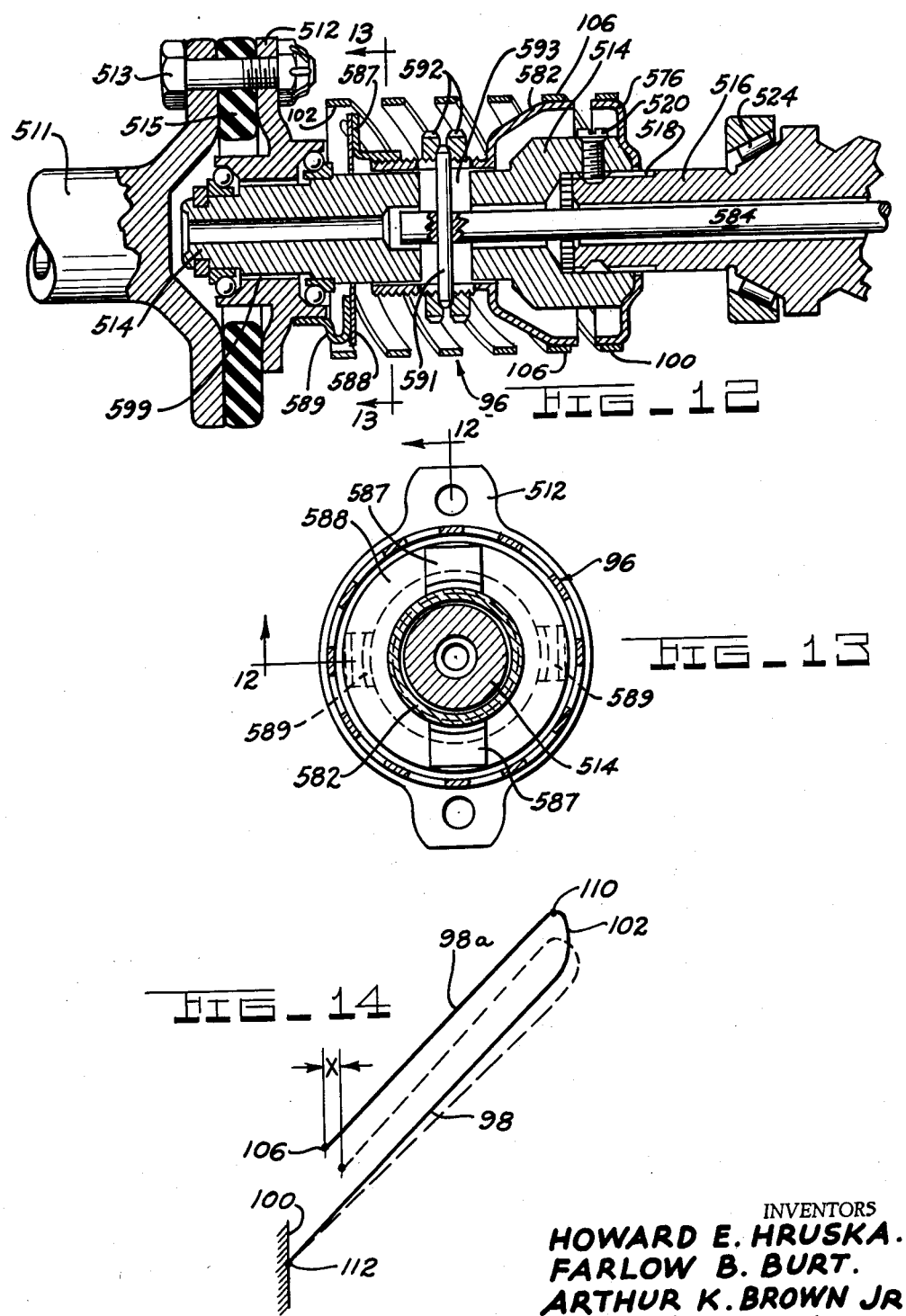

United States Patent Office 3,075,501
Patented Jan. 29, 1963

3,075,501
POWER STEERING MECHANISM
Howard E. Hruska, Farlow B. Burt, and Arthur K. Brown, Jr., South Bend, Ind., assignors to The Bendix Corporation, a corporation of Delaware
Filed June 15, 1959, Ser. No. 820,171
6 Claims. (Cl. 121—41)

The present invention relates to power steering and more particularly to improvements in a combination valve actuating and "feel" transmitting mechanism of the type disclosed in H. E. Hruska's application No. 701,644, now Patent No. 2,964,017.

A primary object of this invention is to provide a simple functionally improved combination valve actuating and "feel" transmitting mechanism which can be more economically fabricated and more easily assembled than previously actuators of this general type.

Another object of this invention is to provide a power steering actuating mechanism for transmitting "feel" to the driver and simultaneously actuating the power steering control valve, wherein the structural arrangement is such that frictional forces and lost motion due to mechanical clearances are substantially eliminated so that a more positive and accurate power steering response will result upon rotation of the steering wheel.

A further object of this invention is to provide a power steering valve actuating means located between the steering gear and steering wheel, wherein said actuating means achieves movement through means of a unitary substantially cylindrical spring stamping consisting of a plurality of angularly disposed struts which also simultaneously transmit "feel" to the driver.

An important object of this invention is to provide for a given design requirement a valve actuator of the unitary substantially cylindrical spring stamping type consisting of a plurality of angularly disposed struts whose configuration is such that the axial length of the stamping will be approximately one-half the axial length of previously existing valve actuators of the same general type needed to withstand the stresses of the same design requirement.

More specifically, it is an object of this invention to provide a valve actuator of the unitary spring stamping type which in effect consists of a plurality of angularly disposed U-shaped struts, one end of which is connected to a fixed member and the other end of which is connected to a movable valve actuating member.

The above and other objects and features of this invention will be apparent from the following description of the mechanism taken in connection with the accompanying drawings which form a part of this specification and in which:

FIGURE 1 is a sectional view of a power steering unit, constructed in accordance with the present invention, which is shown in association with parts of a vehicle drawn schematically;

FIGURE 2 is a sectional view taken along line 2—2 of FIGURE 1;

FIGURE 3 is a sectional view taken along line 3—3 of FIGURE 1;

FIGURE 4 is a plan view of the spring actuator stamping utilized in the arrangements shown in FIGURES 1, 10 and 12;

FIGURE 5 is a perspective view of the spring actuator stamping of FIGURE 4 after having been rolled into a substantially cylindrical shape for use in connection with the valve actuator and "feel" transmitting assembly;

FIGURE 6 is a sectional view of another embodiment of a valve actuator and "feel" transmitting assembly for use in connection with a power steering unit of the type shown in FIGURE 1;

FIGURE 7 is a plan view of the spring actuator stamping utilized in the arrangement shown in FIGURE 6;

FIGURE 8 is a perspective view of the spring actuator stamping of FIGURE 7 after having been rolled into a substantially cylindrical shape;

FIGURE 9 is a sectional view of an actuator assembly, somewhat similar to the assembly shown in FIGURE 1, which utilizes two concentric spring actuator stampings of the type shown in FIGURES 7 and 8;

FIGURE 10 is a sectional view of a modified version of the actuator assembly shown in FIGURE 1 and is taken along line 10—10 of FIGURE 11;

FIGURE 11 is a sectional view taken substantially along line 11—11 of FIGURE 10;

FIGURE 12 is a sectional view of another modified version of the actuator assembly shown in FIGURE 1 and is taken substantially along line 12—12 of FIGURE 13;

FIGURE 13 is a sectional view taken substantially along line 13—13 of FIGURE 12; and FIGURE 14 is a schematic view of a component of the spring actuator stamping shown in FIGURE 5, wherein movements are somewhat exaggerated for clarity.

Referring to FIGURE 1, it will be seen that reference numeral 10 designates the front wheels of a vehicle to be steered by rotation of a steering wheel (not shown) which is suitably connected to steering collar 12. A shaft section 14, which is fixedly connected to a worm 16 through means such as splines 18 and set screw 20, is drivably connected to the steering collar 12 by means of a control assembly indicated generally by numeral 22. The shaft section and worm are held against axial displacement by thrust bearings 24 located at each end of the worm. A roller sector gear 26 is arranged in meshing relationship with the worm and is carried by one end of a sector shaft 28 which is properly journaled in housing 30. A pitman arm 32 is connected to the other end of sector shaft 28 and to the spindle arms 34 of the wheels 10 through a steering linkage assembly which includes tie rods 36, a cross tie rod 38, and an idler arm 40 suitably pivoted at one end to the vehicle frame 42.

The hydraulic system of the steering gear includes a fluid motor 44 which is connected between the cross tie rod 38 and the vehicle frame 42. The piston 46 divides the cylinder 50 into opposed chambers constantly communicating respectively with cylinder ports 52 and 54 of valve 56, via conduits 58 and 60. The valve, which is of conventional construction, is suitably attached to the end of the gear housing and includes two annular grooves 62 and 64 in valve spool 65, which communicate with a reservoir (not shown) via return port 66, and a third annular groove 68 intermediate grooves 62 and 64, which communicates with a pump (not shown) via inlet port 70. The valve body is provided with two annular grooves 72 and 74, which communicate with cylinder ports 52 and 54 respectively, and which overlap the grooves in the valve spool to provide open passages through the valve when the spool is in neutral position.

Valve actuation is provided through means of the control assembly 22 which includes a collar 76 fixedly connected to shaft section 14 through means such as keys 78 and set screw 80, as shown in FIGURES 1 and 3, and a washer-like actuating member 82 which is operatively connected to steering collar 12 and to an actuating rod 84, as shown in FIGURE 2, said rod being connected to valve spool 65. The connection between actuating member 82 and the collar 12 includes a pair of solid pins 86 which are threaded to or otherwise suitably attached to collar 12, each of which has a roller 88 retained near the end thereof by a roller pin 90. The connection between actuating member 82 and actuating rod 84 includes an eccentric adjusting screw 92 which is threaded into member 82 and extends into a slot 94 formed near the end of rod 84. By using such an eccentric screw it is possible to axially adjust the rod 84 and valve spool 65 simply by rotating the adjusting screw 92. Suitably connected to collar 76 and actuating member 82 is a cage-like spring stamping 96, which upon rotation of steering collar 12 causes axial movement of actuating member 82, rod 84 and valve spool 65. The construction of spring stamping 96 may be more clearly seen by referring to FIGURES 4 and 5. It should be noted that the spring stamping consists of a plurality of struts 98 and strut extensions 98a which extend between bands 100 and 102. Each of the struts 98 are connected to both of the bands 100 and 102, while each of the strut extensions 98a are connected only to band 102. After stamping the actuator spring 96, shown in FIGURE 4, from sheet metal, it is rolled into a substantially cylindrical shape, as shown in FIGURE 5. A ring 104 is then suitably connected to band 102 so as to maintain the actuator spring 96 in its substantially cylindrical cage-like configuration. If the strut configuration, shown in FIGURE 5, were made out of tubing, ring 104 would not be necessary. Referring to FIGURES 1 and 2, it will be seen that band 100 of actuator spring 96 is suitably connected to collar 76 through means such as riveting or welding, while the ends 106 of strut extensions 98a are connected to actuating member 82 also through suitable means such as riveting or welding. The band 102, with the ring 104 attached thereto, is the free floating end of actuator spring 96 and is not fixed to any of the structure adjacent thereto. Limited relative movement between steering collar 12 and shaft section 14 is provided by the pin and slot arrangement shown in FIGURE 3, wherein the pins 86 are fixedly connected to steering collar 12 and the slots 108 are formed in collar 76, the collar 76 being fixedly connected to shaft section 14.

The above described steering mechanism operates in the following manner: Upon initial turning of steering collar 12, a certain amount of steering force is transmitted directly to shaft section 14 through the actuator cage 96 of control assembly 22. The strut 98 and strut extension 98a of actuator cage 96, which begin deflecting upon any slight initial rotational movement of steering collar 12, are capable of transmitting rotational forces from the steering collar 12 to shaft section 14 in proportion to the degree of their deflection or deformation. Any amount of deformation of the struts will result in immediate axial movement of actuating member 82, rod 84 and valve spool 65, but no power boost will result until axial movement of the actuating member 82 has moved the valve spool to a position which will result in increased pressurization of one or the other of the power cylinder chambers. Thus rotation of the steering collar 12 in a clockwise direction (looking at FIGURES 1 and 5 from the left) will cause member 82, rod 84 and valve spool 65 to move to the right. More specifically, when the steering collar 12 is rotated in a clockwise direction it will transmit like rotative motion to actuating member 82 through means of pins 86 and rollers 88. Since clockwise rotation of actuating member 82 will cause the ends 106 of each strut extension 98a to pivot about the connecting points 110 between the strut extension 98a and band 102, such movement causing the ends 106 and the actuating member 82 to move axially to the right. Axial movement between member 82 and pins 86 is permitted because of rollers 88. At the same time, such clockwise rotation of ends 106 will also cause band 102 to move in a clockwise direction, which in effect causes struts 98 to pivot about the connecting points 112 between the struts 98 and band 100, thus causing further movement of the ends 106 and actuating member 82 to the right. In effect the actuating cage may be considered to consist of a plurality of U-shaped struts or springs 98—98a such as that which is shown schematically in FIGURE 14, wherein the effective ends of the struts 98—98a are located at 106 and 112.

Referring to FIGURE 14 it will be seen that each end 106, which is connected to actuating member 82, will move axially to the right an amount "X" when clockwise rotative motion of actuating member 82 causes each U-shaped spring strut 98—98a to simultaneously pivot about points 110 and 112. Movement of the strut 98—98a has been exaggerated to bring out the axial movement "X" of end 106. Rotation of the steering collar 12 in a counter-clockwise direction will cause member 82, rod 84 and valve spool 65 to move to the left. Such movement will result in the manner previously described except that pivoting about points 110 and 112 will be in the opposite direction. After the torque applied to the steering collar 12 is released, the struts 98—98a of actuator cage 98 will return the valve spool to its neutral position. In the event of power failure manual steering is provided by means of the pin and slot arrangement 86—108, as shown in FIGURE 3. Thus, once the pins 86 make contact with the walls of slots 108, manual steering will be possible.

FIGURE 6 shows another embodiment of the invention which utilizes a spring stamping having an angularly disposed strut configuration, as shown in FIGURES 7 and 8. Although this configuration, as shown in the drawings, appears to have an axial length which is less than the axial length of the FIGURE 5 configuration, if both configurations were drawn to the same scale and designed to withstand the same stresses for a given design requirement, the FIGURE 8 configuration would have an axial length almost twice that of the FIGURE 5 configuration. Thus, although both configurations operate in somewhat the same manner, the FIGURE 5 configuration has the advantage of requiring less space, a very important feature, especially where space is at a premium, as is so often the case in power steering installations. Referring to FIGURE 6, wherein like parts are designated by the same numerals used in FIGURE 1 plus 200, valve actuation is provided through means of a control assembly 222 which includes an actuating member 282 slidably connected to steering shaft 211 of steering collar 212 through means such as splines 213 and operatively connected to actuating rod 284 in the same manner as shown in FIGURES 1 and 2. Suitably connected to shaft section 214 and to actuating member 282 is a cage-like spring stamping 296 of the type shown in FIGURES 7 and 8, which upon rotation of steering collar 212 causes axial movement of actuating member 282, rod 284 and the valve spool attached thereto. Thus rotation of the steering collar 212 in a clockwise direction (looking at FIGURES 6 and 8 from the left) will cause valve actuating member 282 and rod 284 to move to the left, while rotation of the steering collar in a counter-clockwise direction will cause movement to the right. Limited relative movement between steering collar 212 and shaft section 214 is provided by free motion splines 299, wherein the spline grooves formed in steering collar 212 are wider than the splines formed on the shaft section 214. In the event of power failure manual steering is available once the spline groove walls of steering collar 212 make contact with the splines of shaft section 214.

FIGURE 9 shows a further embodiment of a valve actuator and "feel" transmitting assembly which is somewhat similar to the assembly shown in FIGURE 1, except for the fact that two concentric spring actuator stampings of the type shown in FIGURES 7 and 8 are used instead of a spring stamping of the type shown in FIGURE 5. Like parts are designated by the same numerals used in FIGURE 1 plus 300. Valve actuation is provided through means of a control assembly which includes a collar 376 which is fixedly connected to shaft section 314 through means such as member 377 and set screw 380, and an actuating member 382 which is operatively connected to steering collar 312 and to an actuating rod 384, said actuating rod being connected to a valve spool. The connection between the actuating member 382 and the collar 312 includes a roller 388 on each side of a flat collar extension 389, each of which is operatively connected to actuating member 382 by roller pins 390 so that rotative motion of the steering collar 312 can be transmitted to the actuating member 382 via collar extension 389 and rollers 388. The resulting axial movement between actuating member 382 and collar 312 is permitted because of the rolling action between the rollers and the collar extension. The actuating rod 384 is threaded to actuating member 382 and may be axially adjusted by rotating the rod and locking it in the proper position with a set screw 392. Each of the spring stampings have a configuration like that which is shown in FIGURES 7 and 8 and are connected to each other at one end by a ring 404. The opposite end of one of the spring stampings is suitably connected to collar 376 while the opposite end of the other spring stamping is suitably connected to actuating member 382. The ends attached to ring 404 are the free floating ends. Thus, it can be seen that two concentric spring stampings arranged in this manner are equivalent to the spring stamping configuration of FIGURE 5 and would require no more axial space for a given design requirement than would the FIGURE 5 spring configuration. Operation of this arrangement is essentially the same as the FIGURE 1 arrangement. Thus, rotation of the steering collar 312 in a clockwise direction (looking at FIGURE 9 from the left) will cause movement of the valve actuating member 382 and rod 384 to the right, while counterclockwise rotation of the steering collar will cause movement of the actuating member and rod to the left. Manual steering is provided by free motion splines 399 in a manner similar to that which was described in connection with FIGURE 6.

FIGURES 10 and 11 show a modified version of the actuator assembly shown in FIGURE 1 and differs mainly in the operative connection between the steering collar and the valve actuating member. Like parts are designated by the same numerals used in FIGURE 1 plus 400. As previously described, the operative connection between the collar 12 and actuating member 82 of FIGURE 1 included a pair of solid pins 86, each of which had a roller 88 retained near the end thereof by a roller pin 90. In order to eliminate the slight amount of backlash that may arise by using such rollers, the rollers have been replaced in the FIGURE 10 embodiment by a pair of flexible spring steel members 488 which are strong torsionally, but weak axially. These flexible members are suitably attached at one end by means such as a weld or rivet 487 to pins 486 and at the other end by means such as a weld or rivet 489 to actuating member 482. A cage-like spring stamping of the type shown in FIGURE 5 (not shown in FIGURE 10) is connected to collar 476 and actuating member 482 in the same manner as in FIGURE 1. Thus, band portion 100 is suitably connected to collar 476 and ends 106 of struts 98a are suitably connected to actuating member 482. Operation of the FIGURE 10 modification will be exactly the same as the FIGURE 1 embodiment, except that rotative forces will be transmitted from the collar 412 to actuating member 482 by the flexible members 488, said flexible members also permitting axial movement of the actuating member 482, actuating rod 484 and the valve spool attached thereto.

FIGURES 12 and 13 show the preferred structural arrangement of our invention, the basic operation of this arrangement being essentially the same as that of the FIGURE 1 arrangement. Like or similar parts are designated by the same numerals used in FIGURE 1 plus 500. Referring to FIGURE 12, it will be noted that the steering shaft 511 is operatively connected to steering collar 512 by means such as bolts 513 (only one of which is shown), said connection including a flexible coupling member 515 interposed between the steering shaft and steering collar. The steering shaft could also be similarly connected to any of the other previously described actuator arrangements. The control assembly of this arrangement includes a collar-like member 576 which is fixedly connected to shaft section 514 by suitable means such as welding, and an actuating member 582 which is operatively connected to steering collar 512 and to an actuating rod 584, said rod being connected to a valve spool (not shown). The connection between the actuating member 582 and steering collar 512 includes a flexible spring steel washer 588 which is operatively connected to actuating member 582 by a pair of oppositely disposed bracket-like members 587 and to steering collar 512 by another pair of oppositely disposed bracket-like members 589 which are positioned at 90° from the first mentioned pair of brackets. Construction of the washer 588 is such that it will be strong torsionally and weak axially. Suitable means such as welding may be used to connect the bracket-like members 587 and 589 to the actuating member 582 and steering collar 512, respectively, and to the flexible washer 588. The connection between the actuating member 582 and the actuating rod 584 includes a pin 591 and a pair of adjustable nuts 592 threaded on to the sleeve-like portion of actuating member 582 for moving the pin 591 within slot 593. In this manner means for axially adjusting the actuating rod and the valve spool attached thereto is provided. A cage-like spring stamping 96, identical with the one shown in FIGURE 5 is suitably connected to actuating member 582 and to collar-like member 576 in much the same manner as in FIGURE 1, except that the spring stamping 96 is reversed so that the free floating band 102 is on the left rather than on the right. Thus, it will be seen that band portion 100 of spring stamping 96 is suitably connected to collar 576 and ends 106 of struts 98a are suitably connected to actuating member 582. Limited relative movement between steering collar 512 and shaft section 514 is provided by free motion splines 599, wherein the spline grooves formed in steering collar 512 are wider than the splines formed on the shaft section 514. Operation of the FIGURE 12 arrangement will be essentially the same as in the FIGURE 10 arrangement except that a single flexible washer 588 has been substituted in place of the pair of flexible members 488 used in the FIGURE 10 arrangement. Thus, the single washer 588 will transmit rotative forces from collar 512 to actuating member 582 and permit axial movement of the actuating member 482, actuating rod 484 and the valve spool attached thereto when the struts 98—98a of the spring stamping start to flex. In the event of power failure manual steering is available once the spline groove walls of steering collar 512 make contact with the splines of shaft section 514.

The several practical advantages which flow from our invention are believed to be obvious from the above description, and other advantages may suggest themselves to those who are familiar with the art to which this invention relates.

Furthermore, although this invention has been described in connection with certain specific embodiments, it will be obvious to those skilled in the art that various changes may be made in the form, structure and arrangement of parts without departing from the spirit of the invention. Accordingly, applicants do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In a servomotor, driven means, a hydraulic ram drivingly connected to said driven means, a valve for controlling the operation of said ram, an operating shaft, a driven shaft connected to said driven means, a member axially movable with respect to said shafts, said member being operatively connected to one of said shafts and to said valve, a spring actuator for simultaneously opposing rotation of said operating shaft and causing axial movement of said member in one direction upon clockwise rotation of said operating shaft and in the opposite direction upon counter-clockwise rotation of said operating shaft, said spring actuator comprising a plurality of substantially U-shaped struts each of which includes a free floating curved portion, an end which is operatively connected to the other of said shafts and an end which is operatively connected to said member.

2. In a power steering mechanism having steering means, a power cylinder connected to said steering means, and a valve for controlling the operation of said power cylinder, a valve actuating mechanism comprising a steering shaft, a driven shaft connected to said steering means, a member axially movable with respect to said shafts, said member being operatively connected to one of said shafts and to said valve for actuation thereof, and an annular unitary spring actuator for simultaneously opposing rotation of said steering shaft and causing axial movement of said member in one direction upon clockwise rotation of said steering shaft and in the opposite direction upon counter-clockwise rotation of said steering shaft, said spring actuator including a plurality of struts, a plurality of strut extensions interposed between said struts, a first band for connecting one end of each of said struts to each other, said first band being operatively connected to the other of said shafts, and a second free floating band for connecting the other end of each of said struts and one end of each of said strut extensions to each other, said other end of each of said strut extensions being operatively connected to said member.

3. In a power steering mechanism having steering means, a power cylinder connected to said steering means, and a valve for controlling the operation of said power cylinder, a valve actuating mechanism comprising a steering shaft, a driven shaft coaxial with said steering shaft and connected to said steering means, a member axially movable with respect to said shafts, said member being operatively connected to said steering shaft and to said valve for actuation thereof, and an annular unitary spring actuator concentric with said shafts for simultaneously opposing rotation of said steering shaft and causing axial movement of said member in one direction upon clockwise rotation of said steering shaft and in the opposite direction upon counter-clockwise rotation of said steering shaft, said spring actuator including a plurality of struts, a plurality of strut extensions interposed between said struts, each of said struts and strut extensions being angularly positioned with respect to the axes of said steering and driven shafts at angles less than 90°, a first band for connecting one end of each of said struts to each other, said first band being operatively connected to said driven shaft, and a second free floating band for connecting the other end of each of said struts and one end of each of said strut extensions to each other, said other end of each of said strut extensions being operatively connected to said member.

4. A valve actuating mechanism as defined in claim 3 wherein the operative connection between said member and said steering shaft includes roller means for transmitting rotative forces from said steering shaft to said member while permitting axial movement of said member.

5. A valve actuating mechanism as defined in claim 3 wherein the operative connection between said member and said steering shaft includes a flexible element, one end of which is fixedly connected to said member and the other end of which is fixedly connected to said steering shaft, said flexible element being torsionally strong to transmit rotative forces from said steering shaft to said member and axially weak to permit axial movement of said member.

6. A valve actuating mechanism as defined in claim 3 wherein the operative connection between said member and said steering shaft includes a flexible washer fixedly connected to said member at two oppositely disposed points and to said steering shaft at two other oppositely disposed points located 90° from said first mentioned points, said flexible washer being torsionally strong to transmit rotative forces from said steering shaft to said member and axially weak to permit axial movement of said member.

References Cited in the file of this patent
UNITED STATES PATENTS

| | | |
|---|---|---|
| 1,719,875 | Cooper | July 9, 1929 |
| 2,362,930 | Robbins | Nov. 14, 1944 |
| 2,368,135 | Hamill | Jan. 30, 1945 |
| 2,496,369 | Baghuis | Feb. 7, 1950 |
| 2,788,770 | Folkerts | Apr. 16, 1957 |
| 2,930,359 | MacDuff | Mar. 29, 1960 |